United States Patent
Oya et al.

(10) Patent No.: US 10,507,579 B2
(45) Date of Patent: Dec. 17, 2019

(54) CONTROL SYSTEM TO WHICH CONTROL CPU IS ADDABLE

(71) Applicant: FANUC CORPORATION, Yamanashi (JP)

(72) Inventors: Tomoki Oya, Yamanashi (JP); Yuuki Fukumoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 104 days.

(21) Appl. No.: 15/480,946

(22) Filed: Apr. 6, 2017

(65) Prior Publication Data

US 2017/0291300 A1 Oct. 12, 2017

(30) Foreign Application Priority Data

Apr. 11, 2016 (JP) .................................. 2016-078827

(51) Int. Cl.
*B25J 9/16* (2006.01)

(52) U.S. Cl.
CPC ............. *B25J 9/161* (2013.01); *B25J 9/1682* (2013.01); *G05B 2219/31115* (2013.01); *G05B 2219/33219* (2013.01); *Y02P 90/18* (2015.11)

(58) Field of Classification Search
CPC ................... B25J 9/161; B25J 9/1682; G05B 2219/31115; G05B 2219/33219; Y02P 90/18
See application file for complete search history.

(56) References Cited

U.S. PATENT DOCUMENTS

| | | | |
|---|---|---|---|
| 7,577,497 B2 | 8/2009 | Johannessen et al. | |
| 8,005,572 B2 | 8/2011 | Evans et al. | |
| 2004/0260563 A1 | 12/2004 | Hashimoto et al. | |
| 2007/0120513 A1* | 5/2007 | Tanaka .................. | B25J 9/1602 318/568.11 |
| 2016/0052141 A1* | 2/2016 | Ide ......................... | B25J 13/088 700/245 |
| 2016/0096275 A1* | 4/2016 | Miyakoshi ............... | B25J 13/06 700/264 |
| 2016/0199975 A1* | 7/2016 | Brooks .................. | B25J 9/0081 700/248 |
| 2017/0273527 A1* | 9/2017 | Han ...................... | A47L 9/2805 |

FOREIGN PATENT DOCUMENTS

| | | |
|---|---|---|
| CN | 2355357 Y | 12/1999 |
| CN | 1935470 A | 3/2007 |
| DE | 112006000533 T5 | 6/2008 |
| DE | 10296624 B4 | 3/2015 |
| EP | 2606404 B1 | 4/2014 |
| JP | H09029671 A | 2/1997 |
| JP | 2001100805 A | 4/2001 |
| JP | A-2007-058736 A | 3/2007 |
| JP | 2011067892 A | 4/2011 |
| WO | 2009097895 A1 | 8/2009 |

* cited by examiner

*Primary Examiner* — Robert T Nguyen
(74) *Attorney, Agent, or Firm* — RatnerPrestia

(57) ABSTRACT

A robot control system according to the present invention includes a robot control device for controlling a robot, and a control CPU detachably provided on the robot control device, for generating an operation command to operate the robot. The robot control device includes a network controller for communicating with the outside of the robot control device, a servo controller for controlling the robot, and a connector for connecting the control CPU to the network controller.

2 Claims, 4 Drawing Sheets

CONTROL SYSTEM TO WHICH CONTROL CPU IS ADDABLE

This application is a new U.S. patent application that claims benefit of JP 2016-078827 filed on Apr. 11, 2016, the content of 2016-078827 is incorporated herein by reference.

BACKGROUND OF THE INVENTION

1. Field of the Invention

The present invention relates to a robot control system, and specifically relates to a robot control system having the function of adding a control CPU during a standalone operation.

2. Description of Related Art

A method for controlling a plurality of robots is proposed in which a plurality of control devices are connected to each other, and one of the plurality of control devices is assigned as a master control device while the others are assigned as slave control devices to provide cooperative control (for example, Japanese Unexamined Patent Publication (Kokai) No. 2007-58736, hereinafter referred to as "patent document 1"). In the method, operation cycles are started with synchronizing operation base periodic signals generated by the individual control devices.

FIG. 1 is a block diagram showing the entire configuration of a conventional robot cooperative control system. As shown in FIG. 1, a robot cooperative control system 1001 has a plurality (e.g., n number) of robot control devices (a first robot control device 1000-1, a second robot control device 1000-2, . . . , and an n-th robot control device 1000-$n$) (hereinafter referred to as "1000-$i$"). The plurality (e.g., n number) of robot control devices include a plurality of CPUs (a first CPU 1003-1, a second CPU 1003-2, . . . , and an n-th CPU 1003-$n$) each of which controls one of a plurality (e.g., n number) of robots (a first robot 1010-1, a second robot 1010-2, . . . , and an n-th robot 1010-$n$) (hereinafter referred to as "1010-$i$"). For example, the first robot control device 1000-1 includes the first CPU 1003-1. The first CPU 1003-1 provides an operation command to the first robot 1010-1. Likewise, the second robot control device 1000-2 includes the second CPU 1003-2. The second CPU 1003-2 provides an operation command to the second robot 1010-2.

In the conventional art shown in FIG. 1, each robot control device 1000-$i$ controls the operation of one robot 1010-$i$. The plurality of robot control devices are connected to each other through a communication connector 1005.

The robot cooperative control system according to the patent document 1 requires as many control CPUs as the number of the robot control devices. As a result, controlling the plurality of robots requires as many control CPUs as the number of the robots, thus causing a cost increase.

SUMMARY OF THE INVENTION

The present invention aims at providing a robot control system that can reduce a cost irrespective of the number of robots to be controlled.

A robot control system according to an embodiment of the present invention includes a robot control device for controlling a robot, and a control CPU detachably provided on the robot control device, for generating an operation command to operate the robot. The robot control device includes a network controller for communicating with the outside of the robot control device, a servo controller for controlling the robot, and a connector for connecting the control CPU to the network controller.

BRIEF DESCRIPTION OF THE DRAWINGS

The objects, features, and advantages of the present invention will be more apparent from the following description of embodiments in conjunction with the attached drawings, wherein.

DETAILED DESCRIPTION OF THE INVENTION

A robot control system according to the present invention will be described below with reference to the drawings.

First Embodiment

Figure 1:
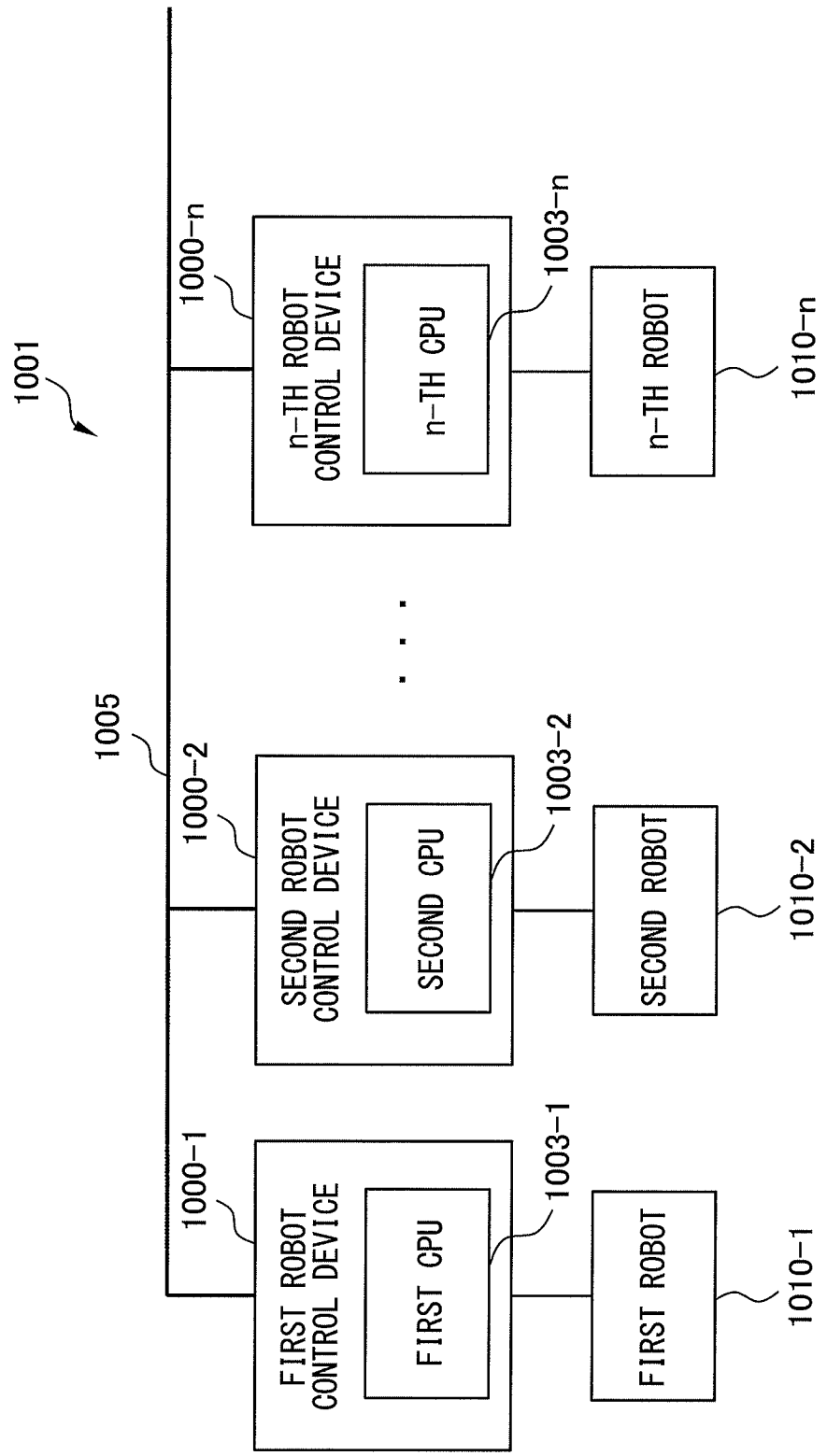
FIG. 1 is a block diagram showing the configuration of a robot cooperative control system according to conventional art.
Figure 2:
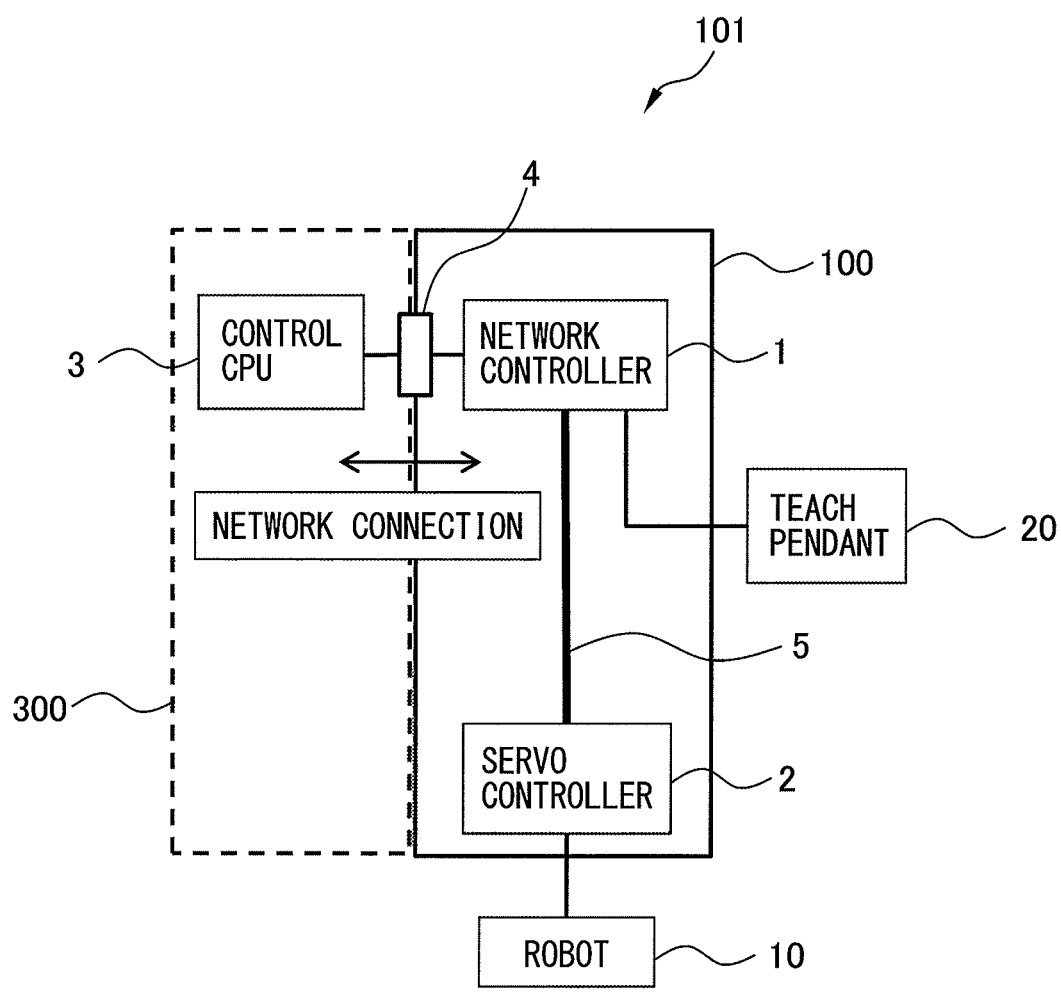
FIG. 2 is a block diagram showing the configuration of a robot control system according to a first embodiment of the present invention.

A robot control system according to a first embodiment of the present invention will be first described. FIG. 2 is a block diagram showing the configuration of the robot control system according to the first embodiment of the present invention. A robot control system 101 according to the first embodiment of the present invention includes a robot control device 100 and a control CPU 3. The robot control device 100 includes a network controller 1, a servo controller 2, and a connector 4.

The robot control device 100 controls a robot 10. The robot control system 101 shown in FIG. 2 performs a standalone operation for controlling the one robot 10.

The control CPU 3 is detachably provided on the robot control device 100 to generate an operation command to operate the robot 10. The control CPU 3 is installed in a CPU storage cabinet 300. The CPU storage cabinet 300 is detachable from the robot control device 100. That is, by connecting the CPU storage cabinet 300 to the robot control device 100, the control CPU 3 is connected to the network controller 1. The operation command generated by the control CPU 3 is provided to the network controller 1 through the connector 4. The control CPU 3 preferably has a module configuration into which at least a memory (not shown) is integrated. FIG. 2 shows the control CPU 3 disposed outside the robot control device 100, but the control CPU 3 may be disposed inside the robot control device 100.

The network controller 1 communicates with the outside of the robot control device 100. To the network controller 1, a teach pendant 20 disposed outside the robot control device 100 may be connected. An instruction command is transmitted from the teach pendant 20 to the network controller 1. FIG. 2 shows the teach pendant 20 connected to the network controller 1 with a wire, but not limited thereto, the teach pendant 20 may be wirelessly connected in a detachable manner.

The servo controller 2 controls the robot 10. That is, the servo controller 2 obtains position information of a servomotor (not shown), which drives each axis of the robot 10, from a sensor (pulse encoder or the like) attached to the servomotor, and controls the operation of the servomotor through a servo amplifier based on an operation command and feedback data from the sensor. As shown in FIG. 2, the robot control system 101 according to the first embodiment controls the one robot 10. Control of a plurality of robots will be described later. The servo controller 2 and the network controller 1 are connected through a bus 5.

The connector 4 connects the control CPU 3, which generates an operation command to operate the robot 10, to the network controller 1. In the robot control system 101 according to the first embodiment, as shown in FIG. 2, the control CPU 3 and the network controller 1 are network-connected.

The robot control system 101 according to the first embodiment of the present invention has the function of adding the control CPU 3 to the robot control device 100 during a standalone operation. To achieve this function, the robot control system 101 has a flexible configuration so as to easily add the control CPU 3 when using only the one robot control device 100.

Figure 3:
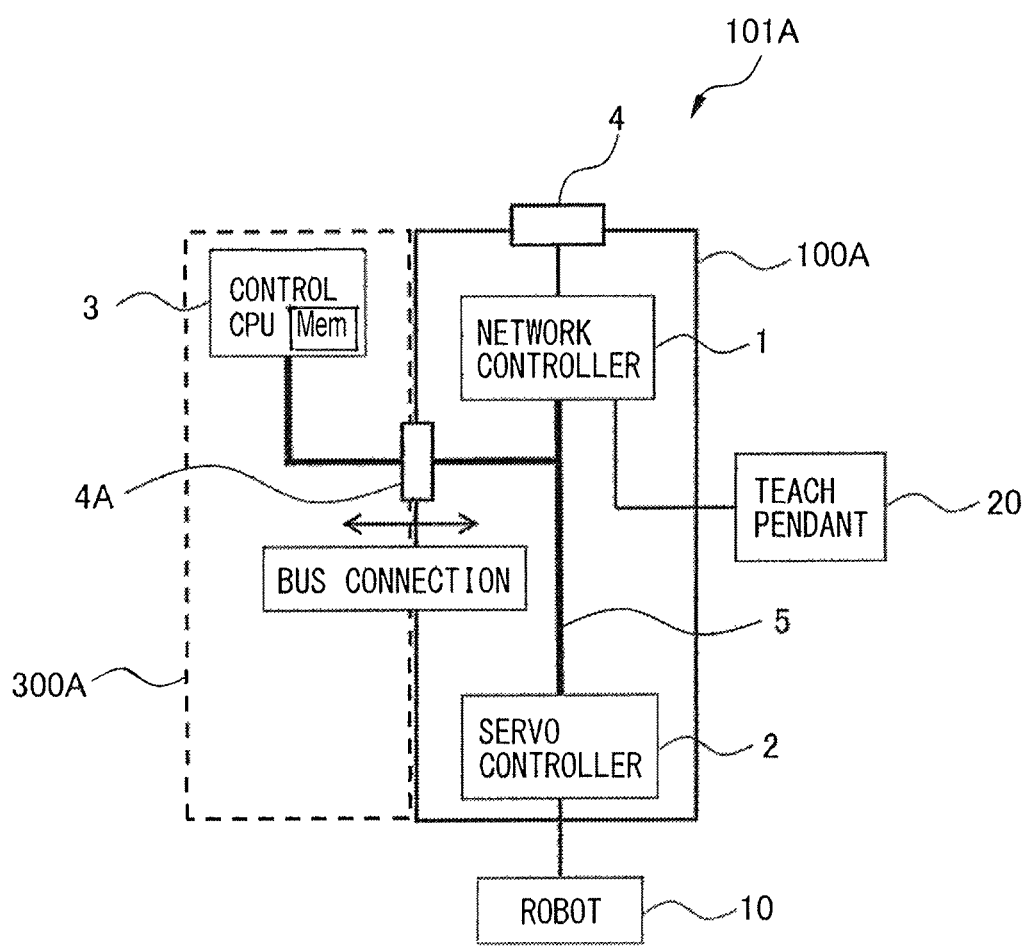
FIG. 3 is a block diagram showing the configuration of a robot control system according to a modification example of the first embodiment of the present invention.

Next, a robot control system according to a modification example of the first embodiment of the present invention will be described. FIG. 3 is a block diagram showing the configuration of the robot control system according to the modification example of the first embodiment of the present invention. In a robot control system 101A according to the modification example of the first embodiment of the present invention, the control CPU 3 is connected to the network controller 1 through the bus. A robot control device 100A includes a bus connector 4A, in addition to the connector 4. The bus connector 4A is connected to the bus 5.

The control CPU 3 is installed in a CPU storage cabinet 300A. The CPU storage cabinet 300A is detachable from the robot control device 100A. An operation command generated by the control CPU 3 is provided to the network controller 1 through the bus connector 4A.

According to the robot control system of the first embodiment of the present invention, when the robot is used alone, the control CPU is addable to the robot control device.

Second Embodiment

Figure 4:
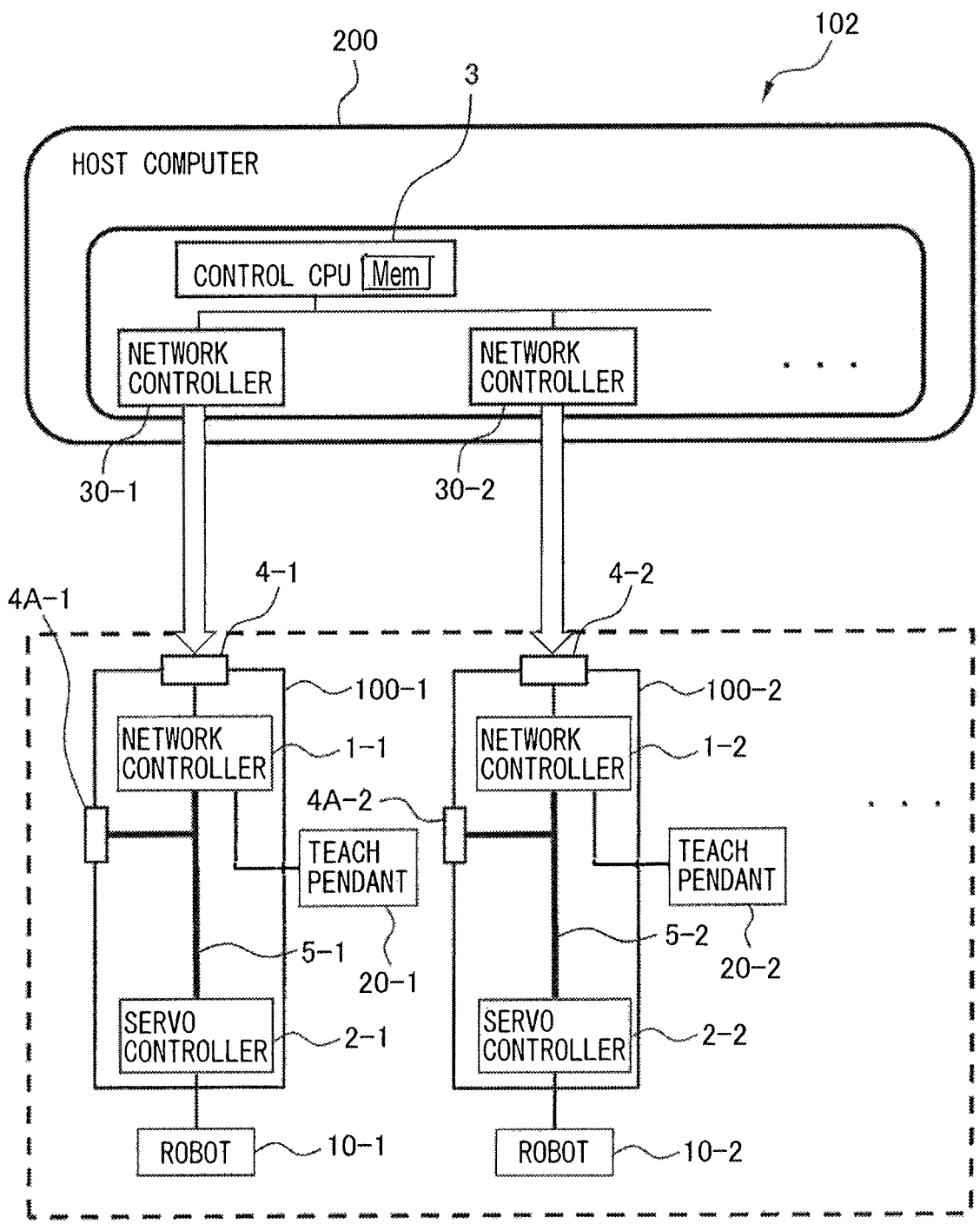
FIG. 4 is a block diagram showing the configuration of a robot control system according to a second embodiment of the present invention.

Next, a robot control system according to a second embodiment of the present invention will be described. FIG. 4 is a block diagram showing the configuration of the robot control system according to the second embodiment of the present invention. The difference between a robot control system 102 according to the second embodiment of the present invention and the robot control system 101 according to the first embodiment is that a control CPU 3 is installed in a host computer 200. The other configuration of the robot control system 102 according to the second embodiment is the same as that of the robot control system 101 according to the first embodiment, so a detailed description is omitted.

In the robot control system 101 according to the first embodiment, as shown in FIG. 2, the one robot control device 100 controls the one robot 10. In the robot control system 102 according to the second embodiment, as shown in FIG. 4, a plurality (e.g., n number) of robot control devices 100-1, 100-2, . . . , and 100-n (hereinafter referred to as "100-i", where i=1, 2, . . . , and n (the same in the following description)) control a plurality (e.g., n number) of robots 10-1, 10-2, . . . , and 10-n (hereinafter referred to as "10-i").

The robot control system 102 according to the second embodiment includes the plurality (e.g., n number) of robot control devices 100-i and the control CPU 3. The plurality of robot control devices 100-i each include network controllers 1-1, 1-2, and 1-n (hereinafter referred to as "1-i"), servo controllers 2-1, 2-2, . . . , and 2-n (hereinafter referred to as "2-i"), and connectors 4-1, 4-2, . . . , and 4-n (hereinafter referred to as "4-i").

The plurality of network controllers 1-i communicate with the host computer 200. To the network controllers 1-i, teach pendants 20-1, 20-2, and 20-n (hereinafter referred to as "20-i") disposed outside the individual robot control devices 100-i may be connected. An instruction command is transmitted from each teach pendant 20-i to each network controller 1-i. FIG. 4 shows the teach pendants 20-1 and 20-2 connected to the network controllers 1-1 and 1-2 with wires, but not limited thereto, the teach pendants 20-i may be wirelessly connected in a detachable manner.

The plurality of servo controllers 2-i each control the plurality of robots 10-i. That is, each servo controller 2-i obtains position information of a servomotor (not shown), which drives each axis of the robot 10-i, from a sensor (pulse encoder or the like) attached to the servomotor, and controls the operation of the servomotor through a servo amplifier based on an operation command and feedback data from the sensor. As shown in FIG. 4, the robot control system 102 according to the second embodiment controls the plurality of robots 10-i using the plurality of robot control devices 100-i. The plurality of servo controllers 2-i and the plurality of network controllers 1-i are connected through a plurality of buses 5-1, 5-2, . . . , and 5-n (hereinafter referred to as "5-i").

The control CPU 3 for generating operation commands to operate the plurality of robots 10-i is connected to the network controllers 1-i through the connectors 4-i. In the robot control system 102 according to the second embodiment, as shown in FIG. 4, the control CPU 3 is installed in the host computer 200. The host computer 200 includes a plurality of host computer-side network controllers 30-1, 30-2, . . . , and 30-n (hereinafter referred to as "30-i") connected to the control CPU 3.

The plurality of robot control devices 100-i include a plurality of bus connectors 4A-1, 4A-2, and 4A-n (hereinafter referred to as "4A-i"), in addition to the connectors 4-i. The plurality of bus connectors 4A-i are connected to the plurality of buses 5-i.

Although the control CPU 3 is installed in the host computer 200, the control CPU 3 may be detachable. In this case, if the number of robots to be controlled is only one, the control CPU 3 may be disposed in the CPU storage cabinet 300 described in the first embodiment.

The operation commands generated by the control CPU 3 are outputted from the host computer-side network controllers 30-i of the host computer 200 to the network controllers 1-i through the connectors 4-i of the robot control devices 100-i. The control CPU 3 may have a module configuration into which at least a memory (not shown) is integrated.

In the robot control system according to the present invention, the control CPU, which calculates command values to operate the robots, has the detachable module configuration. Therefore, when controlling the plurality of robots, just as with the robot control system according to the second embodiment, the control CPU is installed in the host computer on the network and control signals are transmitted from the host computer.

On the other hand, in the standalone operation for controlling the single robot, just as with the robot control system according to the first embodiment, the control CPU is detachable from the network and attachable to the robot control device, thus allowing a cost reduction.

According to the robot control system of the embodiments of the present invention, it is possible to provide a robot control system that can reduce a cost irrespective of the number of robots to be controlled.

What is claimed is:

1. A robot control system comprising:
   a robot control device for controlling a robot; and
   a control CPU for generating an operation command to operate the robot, wherein
   the robot control device includes:
     a network controller;
     a network connector for connecting the network controller to a network controller of a host computer when the control CPU is integral to the host computer, the control CPU integral to the host computer is configured to control the robot control device and at least one other robot control device via the network connector when the control CPU is integral to the host computer;
     a servo controller for controlling the robot;
     a bus connecting the network controller to the servo controller; and
     a bus connector for connecting the control CPU to the network controller through the bus when the control CPU is remote from the host computer, the control CPU remote from the host computer is detachably mounted to the robot control device and configured to control the robot control device via the bus connector when the control CPU is remote from the host computer.

2. The robot control system according to claim 1, wherein the control CPU has a module configuration into which at least a memory is integrated.

* * * * *